Patented May 16, 1950

2,508,322

UNITED STATES PATENT OFFICE 2,508,322

SEPARATION OF 4 - (4' - CYANO-4',4'-DI-PHENYL - BUTYL - 2') - MORPHOLINE FROM ITS ISOMER

Evelyn H. Wilson, Newark, N. J., assignor to Merck & Co., Inc., Rahway, N. J., a corporation of New Jersey No Drawing. Application June 11, 1948, Serial No. 32,521

9 Claims. (Cl. 260—247)

This invention is concerned with the separation of 4-(4'-cyano-4',4'-diphenyl-butyl-2')-morpholine from its isomer 4-(3'-cyano-3',3'-diphenyl-2'-methyl-propyl-1')-morpholine. 4-(4'-cyano-4',4'-diphenyl-butyl-2')-morpholine is an important intermediate in the synthesis of 4,4-diphenyl-6-(4'-morpholinyl)-heptanone-3 hydrochloride. This latter compound has analgesic properties and is useful as a morphine substitute.

4-(4'-cyano-4',4-diphenyl-butyl-2')-morpholine is ordinarily prepared by the condensation of 4-(2'-chloro-propyl)-morpholine with diphenyl acetonitrile utilizing the conventional procedure for reacting N-substituted-(2'-chloropropyl)-amines with diphenylacetonitrile as described by Schultz et al. (J. A. C. S. 69, pages 188, 189, 2454 and 2459), and described in detail in a co-pending application of applicant's assignee, Serial No. 791,655, filed December 13, 1947, now abandoned. This synthesis results in the formation of two isomeric products owing to the two ways in which the intermediate ethyleneimmonium ring can open during alkylation. This reaction may be chemically represented by the following equation:

obtained previously in the one-step process where the mixture of nitriles was itself reacted with ethyl magnesium bromide.

It is now discovered that the mixture of the nitriles, 4-(4'-cyano-4',4'-diphenyl-butyl-2')-morpholine and 4-(3'-cyano-3',3'-diphenyl-2'-methyl-propyl-1')-morpholine, can be separated from each other and the individual nitrile isomers recovered in substantially pure form. This is accomplished by converting the mixture of nitriles into their salts with a hydrohalic acid or with a substituted benzene sulfonic acid. It is preferred to employ salts of an acid selected from the class which consists of hydrochloric acid, hydrobromic acid, 2,5-dichlorobenzene-sulfonic acid, m-nitrobenzenesulfonic acid and p-chlorobenzenesulfonic acid, fractionally crystallizing said mixture of salts to produce the corresponding salt of the desired isomer and decomposing said salt by treatment with a base to produce the corresponding nitrile isomer.

It has been found that the salts of 4-(4'-cyano-4',4'-diphenyl-butyl-2')-morpholine are, in general, more soluble in organic solvents than the corresponding salts of 4-(3'-cyano-3',3'-diphenyl-2'-methyl-propyl-1')-morpholine.

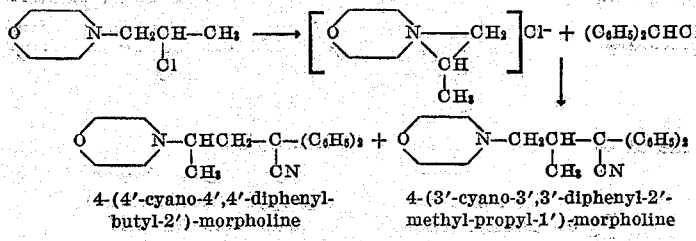

4-(4'-cyano-4',4'-diphenyl-butyl-2')-morpholine 4-(3'-cyano-3',3'-diphenyl-2'-methyl-propyl-1')-morpholine Previously the desired 4,4-diphenyl-6-(4'-morpholinyl)-heptanone-3 hydrochloride has been prepared by treating this mixture of nitriles with ethyl magnesium bromide and then with hydrochloric acid. The separation of said 4,4-diphenyl-6-(4'-morpholinyl)-heptanone-3 hydrochloride from the other end products present in the reaction mixture is extremely complicated and the yield of the desired product has been extremely low.

Attempts to separate these nitriles from each other by fractional crystallization from a solvent such as methanol gave a very poor yield of 4-(4'-cyano-4',4'-diphenyl-butyl-2')-morpholine. When this material was reacted with ethyl magnesium bromide, the overall yield for the two-step process of 4-4-diphenyl-6-(4'-morpholinyl)-heptanone-3 based on the starting mixture of nitriles was not improved over that In order to prepare 4-(4'-cyano-4',4'-diphenylbutyl-2')-morpholine, therefore, the mixture of nitriles is ordinarily converted into the corresponding salts by reaction with the desired acid such as hydrobromic acid, or substituted-benzenesulfonic acid. This reaction is conveniently conducted utilizing alcoholic or aqueous solvent. For example, the reaction between the mixture of nitriles and hydrobromic acid is readily carried out in an alcoholic solvent such as ethanol. The reaction between the nitriles and the substituted-benzenesulfonic acid is ordinary conducted in solution in aqueous acetic acid, although other aqueous or alcoholic solvents may be utilized if desired.

Instead of preparing the salts of the nitriles by reacting the mixture of nitriles with the desired acid, the salts can be prepared by metathesis utilizing a salt of the desired acid. For example, the mixture of the nitrile acetates (in aqueous acetic acid) can be reacted with a salt of the substituted-benzenesulfonic acid, such as the sodium salt, whereby the corresponding substituted benzenesulfonate of the mixed nitriles precipitates as an oil.

The mixture of nitriles, prepared as described above, is then fractionally crystallized from an alcohol such as isopropanol, ethanol, methanol, and the like, or if desired, from an aqueous solution. When this mixture of salts is subjected to fractional crystallization, the sparingly-soluble salt of 4-(3'-cyano-3',3'-diphenyl-2'-methyl-propyl-1')-morpholine with the substituted-benzenesulfonic acid or hydrobromic acid precipitates and is separated from the mixture. The corresponding nitrile can be recovered from this salt, if desired, by treatment with an aqueous alkaline solution such as an aqueous solution of an alkali metal hydroxide.

The solution obtained after removal of the salt of 4-(3'-cyano-3',3'-diphenyl-2'-methyl-propyl-1')-morpholine is then evaporated to small volume. The salt of 4-(4'-cyano-4',4'-diphenyl-butyl-2')-morpholine can be crystallized from the resulting concentrated solution. It is ordinarily preferred, however, to treat the filtrate containing said salt with an aqueous alkaline solution such as an aqueous solution of sodium hydroxide thereby precipitating the desired 4-(4'-cyano-4',4'-diphenyl-butyl-2')-morpholine. This product can be recovered by filtration and purified by crystallization from an alcoholic solution such as methanol, ethanol, isopropanol, and the like, or a hydrocarbon solvent such as petroleum ether. Alternatively, the combined solutions (after removal of the salt of 4-(3'-cyano-3',3'-diphenyl-2'-methyl-propyl-1')-morpholine) can be treated with aqueous sodium hydroxide and the precipitated solid extracted with an organic solvent such as ether, ether-benzene, and the like. The extract is dried and evaporated to produce 4-(4'-cyano-4',4'-diphenyl-butyl-2')-morpholine which is then purified substantially as described above.

It is a preferred feature of this invention that the hydrochlorides of the mixture of nitriles have been found to have reversed solubility characteristics of those possessed by the other salts tried, i. e. that the hydrochloride of the desired 4-(4'-cyano-4',4'-diphenyl-butyl-2')-morpholine is less soluble in alcohols than the hydrochloride of 4-(3'-cyano-3',3'-diphenyl-2'-methyl-propyl-1')-morpholine. This makes it possible to separate the desired nitrile directly from the reaction mixture instead of resorting to the indirect method described above which involves separating the unwanted nitrile from the mixture and recovering 4-(4'-cyano-4',4'-diphenyl-butyl-2')-morpholine from the liquors.

This preferred method comprises treating the mixture of nitriles with aqueous hydrochloric acid and then crystallizing the resulting mixture of hydrochlorides from solution in a lower aliphatic alcohol such as ethanol, methanol and the like, whereby 4-(4'-cyano-4',4'-diphenyl-butyl-2')-morpholine hydrochloride crystallizes in a yield of about 80% of that present in the mixture. This salt can be converted to the free nitrile as in the case of the salts described above, by treatment with a solution of a base such as sodium hydroxide.

If desired, the 4-(3'-cyano-3',3'-diphenyl-2'-methyl-propyl-1')-morpholine can be recovered from the alcohol solution after the removal of the 4-(4'-cyano-4',4'-diphenyl-butyl-2')-morpholine hydrochloride. This is ordinarily accomplished by evaporating said solution to dryness and treating the residual material with an aqueous alkali metal hydroxide solution. The solid nitrile which precipitates is extracted with a solvent such as benzene-ether, and is recovered by evaporating the extract to dryness.

It is possible, utilizing the hydrochlorides as described above, to separate the individual nitrile components in substantially pure form and in a combined yield of over 85% of the total nitriles in the original mixture.

The following examples illustrate methods of carrying out the present invention, but it is to be understood that these examples are given by way of illustration and not of limitation.

*Example 1*

35 gms. of a mixture of 4-(4'-cyano-4',4'-diphenyl-butyl-2')-morpholine and 4-(3'-cyano-3',3'-diphenyl-2'-methyl-propyl-1')-morpholine melting at 85-92° C. (which mixture of nitriles is obtained by condensing 4-(2'-chloro-propyl)-morpholine with diphenyl acetonitrile) was dissolved in 75 cc. of warm isopropanol. 48% aqueous hydrobromic acid was added to this solution until the pH of the solution was 2. The solution was evaporated in vacuo to dryness. The residual material was dissolved in 50 cc. of methanol, 10 cc. of ether was added and the resulting solution was chilled and the sides of the vessel scratched to induce crystallization. The resulting solution was chilled overnight in an ice box and the crystalline product recovered by filtration and dried (M. P. 233-242° C.). This product was recrystallized from absolute ethanol to produce 10 g. of substantially pure 4-(3'-cyano-3',3'-diphenyl-2'-methyl-propyl-1')-morpholine-hydrobromide; M. P. 248-250° C.

The combined filtrates were evaporated in vacuo to small volume and 30% aqueous sodium hydroxide solution was added. The precipitated solid was extracted with ether and the ether layer was washed with water and dried over anhydrous calcium sulfate (Drierite). The ether solution was then filtered and evaporated and the residual product crystallized from petroleum ether (Skellysolve C) to produce 13 gms. of 4-(4'-cyano-4',4'-diphenyl-butyl-2')-morpholine; M. P. 104-107° C.

*Example 2*

A mixture of nitriles, obtained by the condensation of 4-(2'-chloro-propyl)-morpholine with diphenyl acetonitrile, was reacted with hydrochloric acid to produce a mixture of hydrochlorides (M. P. 173-193° C.). 10 gms. of this mixture of nitrile hydrochlorides was dissolved in 35 cc. of absolute ethanol, and the solution was clarified by filtration. This solution was then seeded with the hydrochloride of the lower-melting nitrile (which can be prepared from the material prepared as described in Example 1), and the solution was allowed to remain undisturbed overnight at room temperature. The crystalline product which precipitated was recovered by filtration and washed with 10 cc. of absolute ethanol. The product was further purified by crystallization from 25 cc. of absolute ethanol to produce 4.6 gms. of substantially pure 4-(4'-cyano-4',4'-diphenyl-butyl-2')-morpholine hydrochloride; M. P. 231-235° C. dec.

The purified hydrochloride was dissolved in hot water, 30% aqueous sodium hydroxide was added and the white solid which precipitated was extracted with ether. The ether layer was washed with water, dried over anhydrous calcium sulfate (Drierite) and the ethereal solution evaporated to dryness to produce 4.0 gms. of 4-(4'-cyano-4',4'-diphenyl-butyl-2')-morpholine; M. P. 105–106° C.

The combined alcoholic filtrates were evaporated to dryness and the residual material was dissolved in warm water. 30% aqueous sodium hydroxide was added to this solution and the solid material which precipitated was extracted with benzene-ether. The benzene-ether extract was washed with water, dried over anhydrous calcium sulfate (Drierite) and the filtered solution was evaporated to dryness. The residual material was slurried with methanol and the slurry chilled and filtered to produce 3 gms. of 4-(3'-cyano-3',3'-diphenyl-2'-methyl-propyl-1')-morpholine; M. P. 131–136° C.

Example 3

10 gms. of a mixture of 4-(4'-cyano-4',4'-diphenyl-butyl-2')-morpholine and 4-(3'-cyano-3',3'-diphenyl-2'-methyl-propyl-1')-morpholine (M. P. of the mixture was 85–92° C.) was dissolved in 45 cc. of 36% acetic acid by warming on the steam bath. 8.4 gms. of sodium 2,5-dichlorobenzenesulfonate in 75 cc. of warm water was added to this solution followed by 100 cc. of cold water. The mixture was chilled in an ice bath whereupon an oil separated. The aqueous layer was decanted and the oil was slurried with water until the washes were neutral to litmus. The excess water was drained and 80 cc. of absolute alcohol was added. When all of the oil had dissolved, a crystalline solid began to separate. The mixture was allowed to remain at temperature for 2 hours, and the precipitated solid was recovered from the mixture by filtration and washed with 10 cc. of absolute ethanol. This crude product, which weighed 5.5 gms. and melted at 212–220° C., was recrystallized from methanol to produce the 2,5-dichlorobenzenesulfonic acid salt of 4-(3'-cyano-3',3'-diphenyl-2'-methyl-propyl-1')-morpholine in substantially pure form; M. P. 223–226° C. dec.

The ethanolic filtrate was evaporated in vacuo to a small volume and 30% aqueous sodium hydroxide solution was added. The solid was extracted from this mixture employing ether-benzene as the extraction solvent and the extract was washed with water and dried over anhydrous calcium sulfate (Drierite). The dried extract was then filtered and evaporated to dryness and the residual material slurried with petroleum ether. The crystalline solid thus produced was recovered by filtration and dried to produce 5.5 gms. of crude material; M. P. 95–102° C. This product was recrystallized from ethanol to produce substantially pure 4-(4'-cyano-4',4'-diphenyl-butyl-2')-morpholine; M. P. 105–107° C.

Example 4

10 gms. of mixed nitriles (M. P. 85–92° C. identical with the starting material employed in Example 3) was dissolved in 50 cc. of 36% acetic acid by warming on the steam bath. A solution of 7 gms. of p-chlorobenzenesulfonic acid monohydrate in 25 cc. of 36% acetic acid and 5 cc. of water was added to the solution of the nitriles. 70 cc. of cold water was then added and the mixture was cooled to room temperature whereupon an oil separated. The aqueous layer was decanted and 25 cc. of 36% acetic acid was added to the oil. The crystallized solid which separated was recovered by filtration and washed with water. This product was recrystallized from ethanol to produce 3 gms. of the p-chlorobenzenesulfonic acid salt of 4-(3'-cyano-3',3'-diphenyl-2'-methyl-propyl-1')-morpholine in substantially pure form; M. P. 216–219° C.

The acetic acid filtrate, upon standing, deposited an oil which slowly crystallized. This material was filtered and recrystallized from isopropanol to produce 3.5 gms. of the p-chlorobenzenesulfonic acid salt of 4-(4'-cyano-4',4'-diphenyl-butyl-2')-morpholine in substantially pure form; M. P. 170–173° C.

Example 5

10 gms. of the mixture of nitriles (M. P. 85–92° C., identical with that employed in Examples 3 and 4) was dissolved in 45 cc. of warm 36% acetic acid. 7 gms. of sodium m-nitrobenzenesulfonate in 75 cc. of warm water was added to the solution of the nitriles. The mixture was chilled in an ice bath and the aqueous layer was decanted from the oil which separated. This oil was then slurried with cold water until the washes were neutral to litmus and the water was drained therefrom. 25 cc. of absolute ethanol was added, the solution in the beaker was scratched to induce crystallization and the solution was allowed to remain at room temperature overnight. The solid which separated was filtered and washed with 10 cc. of absolute alcohol to produce 4.7 gms. of the m-nitrobenzenesulphonic acid salt of 4-(3'-cyano-3',3'-diphenyl-2'-methyl-propyl-1')-morpholine.

The filtrate was evaporated to small volume and 30% aqueous sodium hydroxide solution was added. The solid which precipitated, was extracted with ether and the ethereal extract separated and washed with water and dried over anhydrous calcium sulfate (Drierite). The solution was then filtered and evaporated to dryness to produce 4 gms. of crude product; M. P. 92–97° C. This material was recrystallized twice from methanol to produce substantially pure 4-(4'-cyano-4',4'-diphenyl-butyl-2')-morpholine; M. P. 105–107° C.

Various changes and modifications may be made in carrying out the present invention without departing from the spirit and scope thereof. Insofar as these changes and modifications are within the purview of the annexed claims, they are to be considered as part of my invention.

I claim:

1. The process of recovering 4-(4'-cyano-4',4'-diphenyl-butyl-2')-morpholine from a mixture containing that compound and its isomer, 4-(3'-cyano-3',3'-diphenyl-2'-methyl-propyl-1')-morpholine, which comprises forming a mixture of salts of said isomers with an acid selected from the class which consists of hydrochloric acid, hydrobromic acid, 2,5-dichlorobenzenesulfonic acid, m-nitrobenzenesulfonic acid and p-chlorobenzenesulfonic acid, fractionally crystallizing said mixture of salts of said isomers with said acid thereby separating the corresponding salt of the desired isomer from said mixture and decomposing said salt by treatment with an aqueous alkaline solution to obtain said 4-(4'-cyano-4',4'-diphenyl-butyl-2')-morpholine.

2. The process of recovering 4-(4'-cyano-4',4'-diphenyl-butyl-2')-morpholine from a mixture containing that compound and its isomer 4-(3'-cyano-3',3'-diphenyl-2'-methyl-propyl-1')-morpholine, which comprises forming a mixture of the hydrochloric acid salts of said isomers, fractionally crystallizing said mixture of hydrochlorides to produce the hydrochloride of the desired isomer and decomposing said hydrochloride by treatment with an aqueous alkaline solution to obtain said 4-(4'-cyano-4',4'-diphenyl-butyl-2')-morpholine.

3. The process which comprises preparing an alcoholic solution containing a mixture of the hydrochlorides of 4-(4'-cyano-4',4'-diphenyl-butyl-2')-morpholine and 4-(3'-cyano-3',3'-diphenyl - 2' - methyl-propyl-1')-morpholine and crystallizing the sparingly-soluble hydrochloride of 4 - (4'-cyano-4',4'-diphenyl-butyl-2')-morpholine from said alcoholic solution.

4. The process which comprises preparing an ethanolic solution containing a mixture of the hydrochlorides of 4-(4'-cyano-4',4'-diphenyl-butyl-2')-morpholine and 4-(3'-cyano-3',3'-diphenyl - 2' - methyl-propyl-1')-morpholine and crystallizing the sparingly-soluble hydrochloride of 4 - (4' - cyano-4',4'-diphenyl-butyl-2')-morpholine from said ethanolic solution.

5. The process which comprises preparing an alcoholic solution containing a mixture of the hydrobromides of 4-(4'-cyano-4',4'-diphenyl-butyl-2')-morpholine and 4-(3'-cyano-3',3'-diphenyl-2'-methyl-propyl-1')-morpholine, crystallizing and filtering the sparingly-soluble hydrobromide of 4 - (3' - cyano-3',3'-diphenyl-2'-methyl-propyl-1')-morpholine from said alcoholic solution, and recovering 4-(4'-cyano-4',4'-diphenyl-butyl-2')-morpholine from the resulting solution.

6. The process which comprises preparing an isopropanol solution containing a mixture of the hydrobromides of 4-(4'-cyano-4',4'-diphenyl-butyl-2')-morpholine and 4-(3'-cyano-3',3'-diphenyl-2'-methyl-propyl-1')-morpholine, crystallizing and filtering the sparingly-soluble hydrobromide of 4 - (3' - cyano-3',3'-diphenyl-2'-methyl-propyl-1')-morpholine from said isopropanol solution, and recovering 4-(4'-cyano-4',4'-diphenyl-butyl-2')-morpholine from the resulting solution.

7. The process which comprises preparing an alcoholic solution containing a mixture of the 2,5-dichlorobenzenesulfonic acid salts of 4-(4'-cyano-4',4'-diphenyl-butyl-2')-morpholine and 4 - (3' - cyano-3',3'-diphenyl-2'-methyl-propyl-1')-morpholine, crystallizing and filtering the sparingly-soluble 2,5 - dichlorobenzenesulfonic acid salt of 4 - (3' - cyano - 3',3'-diphenyl-2'-methyl-propyl-1')-morpholine from said alcoholic solution, and recovering 4-(4'-cyano-4',4'-diphenyl-butyl-2')-morpholine from the resulting solution.

8. The process which comprises preparing an alcoholic solution containing a mixture of the m-nitrobenzenesulfonic acid salts of 4-(4'-cyano-4',4' - diphenyl-butyl-2')-morpholine and 4 - (3' - cyano-3',3'-diphenyl-2'-methyl-propyl-1')-morpholine, crystallizing and filtering the sparingly-soluble m-nitrobenzenesulfonic acid salt of 4 - (3' - cyano-3',3'-diphenyl-2'-methyl-propyl-1')-morpholine from said alcoholic solution, and recovering 4-(4'-cyano-4',4'-diphenyl-butyl-2')-morpholine from the resulting solution.

9. The process which comprises preparing an aqueous acetic acid solution containing a mixture of the p-chlorobenzenesulfonic acid salts of 4 - (4' - cyano - 4',4' - diphenyl-butyl-2')-morpholine, crystallizing and filtering the sparingly-soluble p-chlorobenzenesulfonic acid salt of 4-(3' - cyano-3',3'-diphenyl-2'-methyl-propyl-1')-morpholine from said aqueous acetic acid solution, and recovering 4-(4'-cyano-4',4'-diphenyl-butyl-2')-morpholine from the resulting solution.

EVELYN H. WILSON.

REFERENCES CITED

The following references are of record in the file of this patent:

FOREIGN PATENTS

| Number | Country | Date |
|---|---|---|
| 61,463 | Denmark | Oct. 25, 1943 |

OTHER REFERENCES

Schultz et al., Jour. Amer. Chem. Soc., vol. 69 (Jan. 1947), pp. 188-189.

Schultz et al., Jour. Amer. Chem. Soc., vol. 69 (1947), pp. 2454-2459.